(No Model.)

C. C. WALWORTH.
PIPE CUTTER.

No. 365,887. Patented July 5, 1887.

WITNESSES
Albert D. Grover
Chas. D. Crocker

INVENTOR
Caleb C. Walworth

UNITED STATES PATENT OFFICE.

CALEB C. WALWORTH, OF BOSTON, MASSACHUSETTS.

PIPE-CUTTER.

SPECIFICATION forming part of Letters Patent No. 365,887, dated July 5, 1887.

Application filed April 21, 1887. Serial No. 235,598. (No model.)

*To all whom it may concern:*

Be it known that I, CALEB C. WALWORTH, of Boston, in the county of Suffolk and State of Massachusetts, have invented a new and useful Improvement in Pipe-Cutters, which will, in connection with the accompanying drawings, be hereinafter fully described, and specifically defined in the appended claims.

Figure 1:
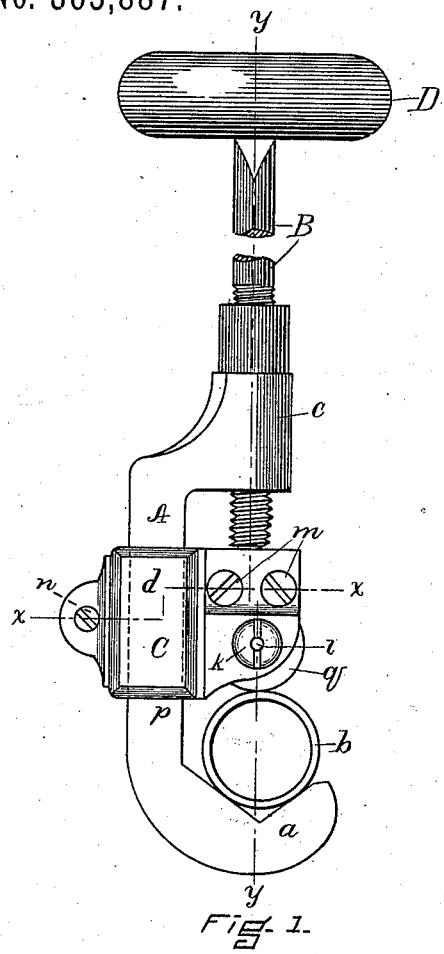
Figure 2:
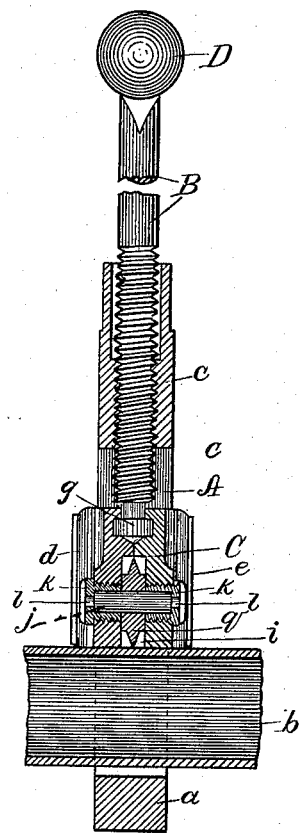
Figure 3:
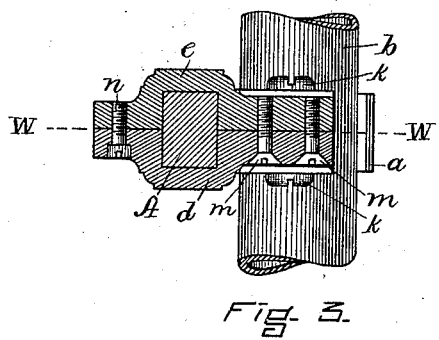
Figure 4:
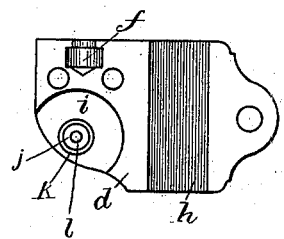

In said drawings, Figure 1 is a side elevation of a pipe-cutter embodying my invention. Fig. 2 is a section taken on line Y Y, Fig. 1, and viewed as from the right in that figure. Fig. 3 is a transverse section taken as on line X X, Fig. 1, and viewed as from the top of the sheet in that figure. Fig. 4 is an inside plan view of the half of the slide C, shown in Fig. 1.

My invention relates to that class of cutters in which the pipe is severed by the action of a sharp, smooth-edged revolving cutter; and it consists in features of novelty, hereinafter fully described, and pointed out in the claims.

Referring again to the drawings, A represents the stock or body formed in one piece, with hook $a$ to receive and hold the pipe $b$ while it is being cut; also, with the straight bar-like part $p$ and the tubular part $c$, in which latter is threaded the rod or lever B, as is shown in Fig. 2. A cross-head or handle, D, secured upon the outer end of rod B, serves as the means of rotating it when adjusting the position of the cutter, or when moving the cutter around the pipe in the act of cutting it. The cutter-carrier or slide C, I form in two parts, $d$ $e$, meeting centrally on bar $p$, as at line W, Fig. 3. In each half of said slide is formed a square groove, $h$, to receive bar $p$, a circular recess, $i$, to receive the rotary cutter $q$, and a recess, $f$, to receive the concentric collar $g$, formed upon the neck at the inner end of rod B, the engagement of said collar in recess $f$ causing a coincident movement of the slide when the rod B is advanced or retracted by being rotated in threaded socket $c$.

The halves of slide C are secured together by screws $m$, which are arranged upon one side of bar $p$, and screw $n$, upon the opposite side thereof. The cutter $q$ is loosely mounted upon its arbor $j$, which is of hardened steel and of a length nearly equal to the thickness of slide C, and is journaled to revolve in the hardened steel hollow screws $k$, which are each threaded in one of the parts of slide C, and are formed with a head, slotted, as shown, to facilitate rotating them by means of a screw-driver, (the head, when forced against the slide, serving to lock the screw and prevent its rotation,) and are also provided with an axial passage, $l$, through the head, for the purpose of oiling the arbor $j$ when in use, as occasion may require. Owing to the form of body A, a slide or cutter-carrier, C, formed in a single piece, cannot be placed thereon from either end, and hence the slide must be formed in two parts united upon some line.

In United States Patent No. 279,207, issued to me June 12, 1883, a slide is shown as formed in two parts, $b$ $b^2$, secured together by rivets $b'$, the rotary cutter $c$ being arranged in a slot, $b^3$, milled in part $b^2$; but in addition to such slide being expensive to make it was further objectionable in that all the strain upon the cutter $c$, which tended to force it from the bar $a'$, was exerted upon the rivets $b'$; but when formed as shown in the accompanying drawings, and secured by the screws arranged upon both sides of bar $p$, the slide when in place upon the bar has the same resisting strength in all directions in which force is exerted upon it as if it were formed in one piece, and the only strain exerted upon the screws $m$ $n$ is to hold its two parts together. Besides this, the seats $i$ are easily counterbored in the inner faces of the halves of the slide, the grooves $h$ are readily milled therein, and the cavity $f$, which could not be formed in a solid slide, is readily formed in a slide divided in the center by means of the well-known tool termed a "cherry," and thus the solid collar $g$ on rod B may be employed instead of the retaining-pin $b^4$, as in my said former patent, which pin is quickly worn by reason of its insufficient bearing surface. The hollow steel screws $k$ furnish a durable journal-bearing for arbor $j$, and if accidentally injured are readily replaced, thus preventing the loss of slide C, as is the case when the arbor bears directly therein, and is allowed to revolve upon its axis, (while the cutter is loose upon it,) as is found desirable, for when the bearings in the slide become slightly worn, which soon occurs, as the slide is of iron, said bearings are then worn at a rapidly-accelerated rate, and the quality of work performed by the cutter is injuriously imperfect; hence the slide is soon rendered worthless.

As arbor $j$ is of hardened steel, it cannot be secured in place by enlarging its ends by riveting; hence the further advantage of hollow screws $k$, whose heads both hold the arbor in place and serve, like "jam-nuts," by their contact with the slide, to lock them in place, so that the frictional action of arbor $j$ when rotated under high pressure will not displace said screws, and by reason of said screws being easily removable, the cutter $q$, when worn or broken, can be replaced by simply removing one of said screws and the arbor, thereby avoiding the disconnecting of the slide.

I claim as my invention—

1. In a pipe-cutter, the stock A, formed with hook $a$, bar $p$, and threaded part $c$ in one piece, in combination with cutter $q$ and its carrying slide C, formed with coinciding halves or parts $d$ $e$, secured together by screws upon opposite sides of bar $p$, and respectively formed with grooves $h$, recesses $i$ and $f$, and adapted to be adjusted on stock A by means of rod B, threaded in part $c$, and interlocked in recess $f$, all substantially as specified.

2. In a pipe-cutter, the combination, with slide C, formed with halves $d$ $e$, as described, of cutter $q$, its arbor $j$, and hollow screws $k$ $k$, respectively threaded in the halves of the slide and frictionally interlocked therein, and arranged to serve as the journal-bearings of said arbor, and formed with passages $l$, communicating with the arbor, substantially as specified.

CALEB C. WALWORTH.

Witnesses:
T. W. PORTER,
EUGENE HUMPHREY.